US009458787B2

(12) United States Patent
Park et al.

(10) Patent No.: US 9,458,787 B2
(45) Date of Patent: Oct. 4, 2016

(54) TECHNIQUE FOR CORRECTING INJECTOR CHARACTERISTICS IN ENGINE OF VEHICLE

(71) Applicants: Hyundai Motor Company, Seoul (KR); Kia Motors Corporation, Seoul (KR); Hyundai Autron Company Ltd., Seongnam, Gyeonggi-Do (KR)

(72) Inventors: Choong Seob Park, Gyeonggi-Do (KR); Hyung Ju Lee, Seoul (KR); Hak Mo Yoo, Gyeonggi-Do (KR); Ji Haeng Lee, Gyeonggi-Do (KR); Doo Jin Jang, Seoul (KR); Kang Hee Cho, Gyeonggi-Do (KR); Si Kwang Lee, Gyeonggi-Do (KR)

(73) Assignees: Hyundai Motor Company, Seoul (KR); Kia Motors Corporation, Seoul (KR); Hyundai Autron Company, Ltd., Seongnam, Gyeonggi-do (KR)

( * ) Notice: Subject to any disclaimer, the term of this patent is extended or adjusted under 35 U.S.C. 154(b) by 289 days.

(21) Appl. No.: 14/144,758

(22) Filed: Dec. 31, 2013

(65) Prior Publication Data

US 2015/0115059 A1 Apr. 30, 2015

(30) Foreign Application Priority Data

Oct. 30, 2013 (KR) ........................ 10-2013-0130128

(51) Int. Cl.

*B60T 7/12* (2006.01)
*F02D 41/30* (2006.01)
*F02D 41/20* (2006.01)
*F02D 41/24* (2006.01)

(Continued)

(52) U.S. Cl.

CPC ........... *F02D 41/3005* (2013.01); *F02D 41/20* (2013.01); *F02D 41/2467* (2013.01); *F02D 41/28* (2013.01); *F02D 41/247* (2013.01); *F02D 2041/1432* (2013.01); *F02D 2041/2051* (2013.01); *F02D 2041/2058* (2013.01); *F02D 2041/285* (2013.01)

(58) Field of Classification Search

CPC ............................ F02D 41/401; F02D 41/008
USPC .......... 701/103–105; 123/434, 435, 673, 674
See application file for complete search history.

(56) References Cited

U.S. PATENT DOCUMENTS 4,265,200 A * 5/1981 Wessel ................ F02D 41/2403 123/487
4,552,114 A * 11/1985 Sano .................. F02D 41/0087 123/198 F (Continued)

FOREIGN PATENT DOCUMENTS

JP H10266885 A 10/1998
JP 3426744 B2 7/2003

(Continued)

*Primary Examiner* — John Kwon
(74) *Attorney, Agent, or Firm* — Mintz Levin Cohn Ferris Glovsky and Popeo, P.C.; Peter F. Corless

(57) ABSTRACT

A technique for correcting injector characteristics is provided. In particular, a micro control unit is configured to generate a control pulse for controlling the operation of an injector; and a driving semiconductor is configured to detect and calculate a driving characteristic of the injector and compensating for injection timing of the control pulse in accordance with a deviation in injection timing of the injector.

8 Claims, 8 Drawing Sheets

(51) Int. Cl.
*F02D 41/28* (2006.01)
*F02D 41/14* (2006.01)

(56) References Cited

U.S. PATENT DOCUMENTS

| | | | | | |
|---|---|---|---|---|---|
| 5,231,962 | A * | 8/1993 | Osuka | F02D 41/062 | 123/179.16 |
| 5,623,909 | A * | 4/1997 | Wertheimer | F02D 41/0027 | 123/501 |
| 5,697,347 | A * | 12/1997 | Enomoto | F02D 41/401 | 123/502 |
| 5,832,901 | A | 11/1998 | Yoshida et al. | | |
| 5,934,249 | A * | 8/1999 | Nanba | F02D 41/0052 | 123/350 |
| 6,050,238 | A * | 4/2000 | Suzuki | F02D 37/02 | 123/295 |
| 6,857,418 | B2 | 2/2005 | Corba | | |
| 7,628,146 | B2 | 12/2009 | Kloppenburg et al. | | |
| 2002/0152985 | A1 * | 10/2002 | Wolff | F02D 19/0631 | 123/305 |
| 2003/0062028 | A1 * | 4/2003 | Kitagawa | F02D 41/105 | 123/486 |
| 2013/0112172 | A1 * | 5/2013 | Toyohara | F02D 41/345 | 123/478 |
| 2014/0026860 | A1 * | 1/2014 | Nakamura | F02D 41/30 | 123/478 |
| 2015/0048757 | A1 * | 2/2015 | Boonen | H05B 33/0845 | 315/294 |

FOREIGN PATENT DOCUMENTS

| | | | |
|---|---|---|---|
| JP | 2004-270595 | A | 9/2004 |
| JP | 2013-060884 | A | 4/2013 |
| KR | 10-2006-0001214 | A | 1/2006 |
| WO | 2004/053317 | A1 | 6/2004 |

* cited by examiner

TECHNIQUE FOR CORRECTING INJECTOR CHARACTERISTICS IN ENGINE OF VEHICLE

CROSS-REFERENCE TO RELATED APPLICATION

This application is based on and claims priority from Korean Patent Application No. 10-2013-0130128, filed on Oct. 30, 2013 in the Korean Intellectual Property Office, the disclosure of which is incorporated herein in its entirety by reference.

BACKGROUND OF THE INVENTION

1. Field of the Invention

The present invention relates to a device for correcting injector characteristics, and more particularly, to a technology capable of improving a deviation compensation response speed by performing a deviation correction function on a driving semiconductor while operating an injector for injecting fuel.

2. Description of the Prior Art

As technology has progressed, engines within vehicles have started to receive data from various sensors of the engine when fuel is supplied to the engine during combustion. In particular, an engine control unit (ECU) determines the amount of supplied fuel based on data and which injector is going to inject determined amount of fuel.

Fuel injectors that inject fuel into the combustion chamber are typically disposed in or around each specific combustion chamber in order to effectively provide the appropriate amount of fuel to the chamber upon demand.

In a common rail system, (i.e., one type of fuel injection system), fuel is supplied to a rail from a high-pressure pump. In this type of system, an ECU controls the pressure of the rail based on data received from a pressure sensor which measures the pressure of the rail and outputs a fuel injection signal so that the fuel is appropriately injected.

In the common rail system, an accelerometer is mounted at the center of an engine block and signals generated by the accelerometer are acquired every hour so that the amount of pilot fuel is adjusted to appropriately configure the state of the injector. Even though this is a relatively small amount of injection, it should be managed within a target deviation even if the fuel is repeatedly injected from the same injector, so that the injector can continue to function as designed, and thus the target deviation is a very important factor in managing appropriately the amount of fuel in pilot injection or post injection.

Further, new enhanced exhaust gas regulation have required vehicle manufacturers to focus their attentions on developing a technology which will achieve more environmentally friendly engines. For example, some governments have further restricted Exhaust gas regulation by requiring a further reduction in the number of exhausted fine particles. The most important technology for reducing the number of exhausted fine particles is multi injection. Multi injection is a method of injecting a small amount of fuel into an engine several times at target fuel injection timings, unlike injecting a large amount of fuel into an engine all at once. This makes it possible to reduce the number of exhausted fine particles in comparison to injecting a large amount of fuel all at once.

The key to multi injection method technology is to inject a small amount of fuel accurately into an engine for a short time in comparison to the existing methods, in which it is required to precisely control the injector that injects the fuel.

FIG. 1, for example, illustrates the relationship between the fuel injection amount and injection time of a common injector. Referring to FIG. 1, it can be seen in the common injector, as the fuel injection time decreases, the relationship between the fuel injection amount and the fuel injection time shows nonlinearity. With the nonlinearity of the relationship between the fuel injection amount and the fuel injection time, it is difficult to accurately estimate or control the amount of fuel that is applied during this time period. Accordingly, it is necessary to develop a technology that can compensate for the nonlinearity allowing for more accurate and effective control.

SUMMARY OF THE INVENTION

Accordingly, the present invention has been made to solve the above-mentioned problems occurring in the prior art while advantages achieved by the prior art are maintained intact.

One object of the present invention is to provide a method and device for correcting injector characteristics that is able to improve a deviation compensation speed and reduce the calculation load of the MCU (Micro Control Unit) by performing a deviation correction function on a driving semiconductor while operating an injector that injects fuel.

In one aspect of an exemplary embodiment of the present invention, there is provided a device for correcting an injector characteristic, including: a micro control unit configured to generate a control pulse to control the operation of an injector; and a driving semiconductor that is configured to detect and calculate a driving characteristic of the injector and compensate for injection timing of the control pulse in accordance with a deviation in injection timing of the injector.

The driving semiconductor may include: an injector characteristic detector configured to detect a driving characteristic of the injector; a data processor configured to convert output from the injector characteristic detector into a data value; a micro core unit configured to generate a deviation correction data for the injection timing of the injector in accordance with the data from the data processor; a controller generating a correction clock by applying the deviation correction data to the control pulse; and an output driving unit controlling the driving of the injector in accordance with the correction clock.

The injector characteristic detector may include: a voltage sensor configured to sense the driving voltage of the injector; a current sensor configured to sense the driving current of the injector; and a selector configured to select between the outputs from the voltage sensor and the current sensor.

The data processor may include: a data converter configured to convert a signal from the injector characteristic detector into digital data; a digital filter configured to filter the digital data from the digital converter; and a memory configured to store output data from the digital filter.

The micro core unit may be configured to initialize the driving semiconductor when the deviation correction data deviates from a target value. As such, the driving semiconductor may further include an interface unit that interfaces with the micro control unit. This interface unit may perform serial parallel interface communication (SPI).

The micro core unit may correct a deviation to increase driving timing of the injector when the injection value of the injector is overly small timing (i.e., smaller than a target timing), and correct a deviation to decrease the driving timing of the injector when the injection value of the injector is overly large timing (i.e., larger than a target timing).

To do so, the micro control unit may include: a driving controller that is configured to receive signal correction information from the driving semiconductor and process the signal in the information; and a control pulse generator controlled by the driving controller that is configured to generate the control pulse.

In another aspect of the present invention, there is provided a device for correcting an injector characteristic, including: an injector characteristic detector that detects a driving characteristic of the injector; a data processor that converts output from the injector characteristic detector into a data value; a micro core unit that generates deviation correction data for the injection timing of the injector in accordance with the data from the data processor; a controller that is configured to generate a correction clock by applying the deviation correction data to the control pulse; and an output driving unit that is configured to control the operation of the injector in accordance with the correction clock.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, embodiments of the present invention will be described in detail with reference to the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles, fuel cell vehicles, and other alternative fuel vehicles (e.g. fuels derived from resources other than petroleum).

Additionally, it is understood that the below methods are executed by at least one controller, computer, control unit or the like. The terms controller, computer, control unit or the like refer to a hardware device that includes a memory and a processor configured to execute one or more steps/processes that should be interpreted as its algorithmic structure. The memory is configured to store algorithmic steps and the processor is specifically configured to execute said algorithmic steps to perform one or more processes which are described further below. Additionally, although the exemplary embodiments are described as being performed a plurality of processors, control units, etc., it should be understood that such a method can also be performed by a single controller configuration without departing from the overall embodiment.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Figure 2:
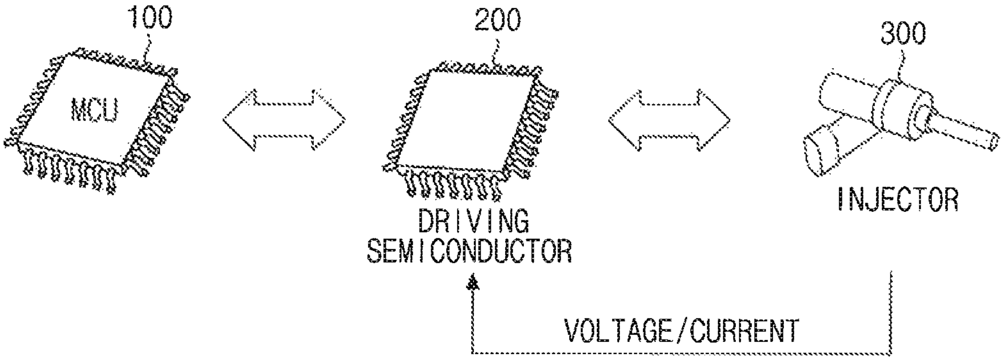
FIG. 2 is a diagram illustrating the configuration of a device for correcting an injector characteristic according to an embodiment of the present invention.

FIG. 2 is a diagram illustrating the configuration of a device for correcting an injector characteristic according to an embodiment of the present invention. An exemplary embodiment of the present invention includes an MCU (Micro Control Unit) 100, a driving semiconductor 200, and an injector 300.

The MCU 100 in the exemplary embodiment of the present invention is configured to receive an interface signal from the driving semiconductor 200 and generates a control pulse for controlling the operation of the injector 300.

The driving semiconductor 200 compensates for injection timing of the injector 300 and outputs a driving control signal in accordance with a control pulse applied from the MCU 100. As such, the driving semiconductor 200 detects and calculates a signal showing the driving characteristic of the injector 300, and when an injection timing deviation of the injector 300 is compensated needs to be compensated for, the driving semiconductor 200 compensates for it accordingly. That is, the driving semiconductor 200 detects the characteristic of the injector 300 whenever the injector is operated and then adjusts the fuel injection timing of the injector 300 based on the detected information in the next injection.

In accordance with the above control, the injector 300 injects fuel with the injection timing compensated for in response to receiving the driving control signal from the driving semiconductor 200. The injector 300 outputs a signal showing the driving characteristic to the driving semiconductor 200. This signal showing the driving characteristic of the injector 300 may be for example voltage or current consumed during injection by the injector 300.

Figure 3:
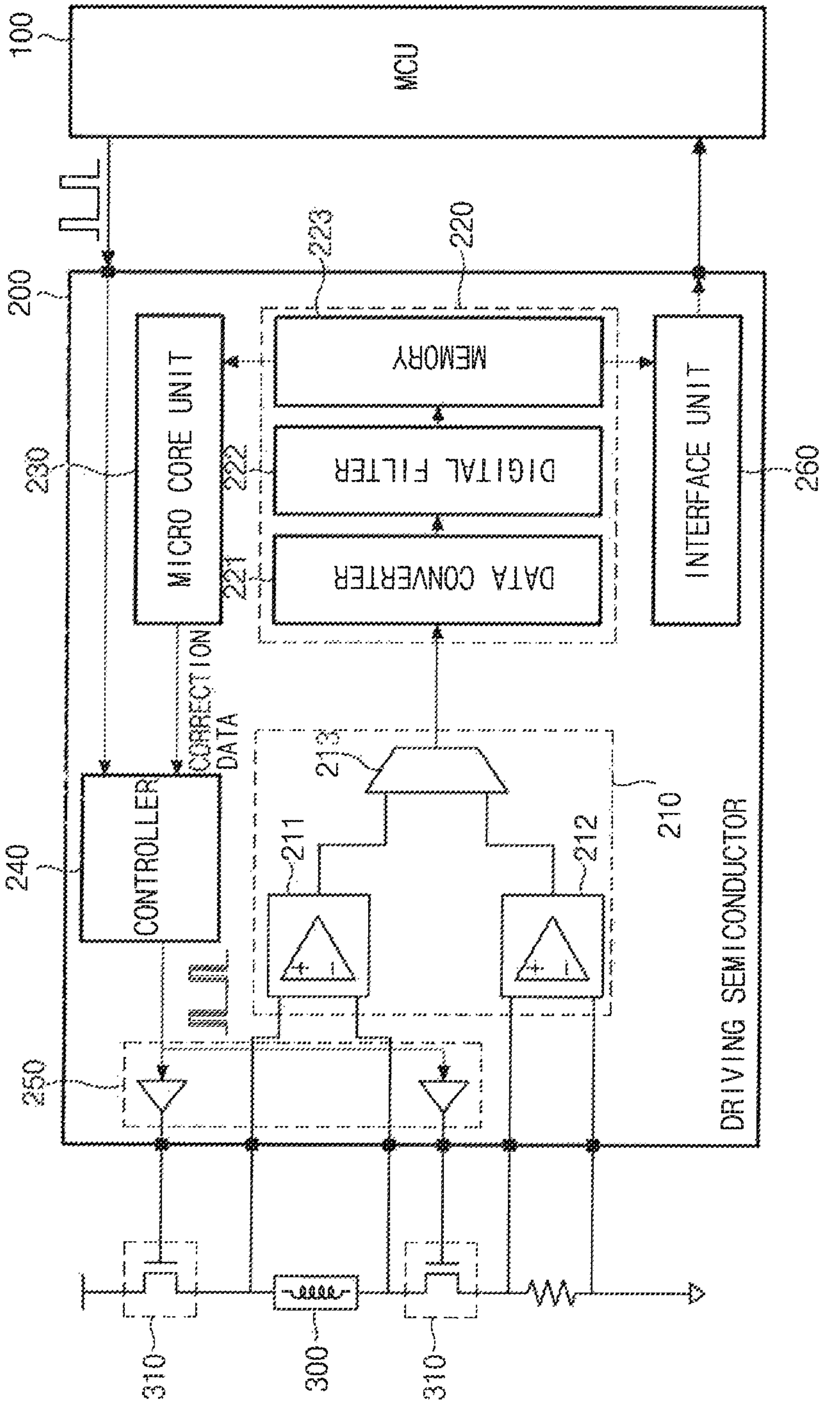
FIG. 3 is a diagram illustrating the detailed configuration of a driving semiconductor of FIG. 2.

FIG. 3 is a diagram illustrating the detailed configuration of the driving semiconductor 200 of FIG. 2. The driving semiconductor 200 may include an injector characteristic detector 210, a data processor 220, a micro core unit 230, a controller 240, an output driving unit 250, and an interface unit 260.

The injector characteristic detector 210 may be configured to sense/detect the driving voltage or the driving current of the injector 300 and output this data to the data processor 220. As such, the injector characteristic detector 210 may include a voltage sensor 211, a current sensor 212, and a selector 213.

In such an embodiment, the voltage sensor 211 may be connected to both end nodes of the injector 300 and configured to sense/detect the amount of voltage consumed during operation the injector 300. Likewise, the current sensor 212 may be connected with the injector driving unit 310 and sense/detect the amount current consumed while operating the injector 300.

The selector 213 may be configured to select between the outputs from the voltage sensor 211 and the current sensor 212 and output the selected data to the data processor 220. This selection of the selector 213 may be controlled by the micro core unit 230. The data processor 220 then converts the value of the voltage or current from the injector characteristic detector into a data value and outputs the converted value to the micro core unit 230 and the interface unit 260. As such, the data processor 220 may include a data converter 221, a digital filter 222, and a memory 223.

The data converter 221 may convert the voltage or current value from the injector characteristic detector 210 into digital data. The digital filter 222 may be configured to remove noise by filtering the digital data from the data converter 221. The memory 223 may be configured to store data once it has been filtered by the digital filter 222.

The micro core unit 230, in the exemplary embodiment of the present invention, may generate deviation correction data for the injection timing of the injector 300 by reading the data stored in the memory 223. More specifically, the micro core unit 230 checks the driving characteristic of the injector 300, using the data in the memory 223, and corrects a deviation by changing a driver control signal, when there is a need for such a correction. When the amount of correction of the deviation is not (for example, over) a target value, the micro core unit 230 may initialize the driving semiconductor 200 by determining that there is a problem in an external load.

The controller 240, in the exemplary embodiment of the present invention, receives a control pulse for controlling the injection timing of the injector 300 from the MCU 100. Further, the controller 240 generates a correction clock by applying the control pulse from the MCU 100 to the correction data from the micro core unit 230. Then the output driving unit 250 operates the injector 300 by controlling the injector driving unit 310 in response to the correction clock from the controller 240.

The interface unit 260 interfaces with the MCU 100 by reading the data in the memory 223. In doing so, the interface unit 260 transmits the correction data in the memory 223 to the MCU 100. The interface unit 260 can transmit/receive data to/from the MCU 100 through, e.g., Serial Parallel interface (SPI) communication.

Figure 4:
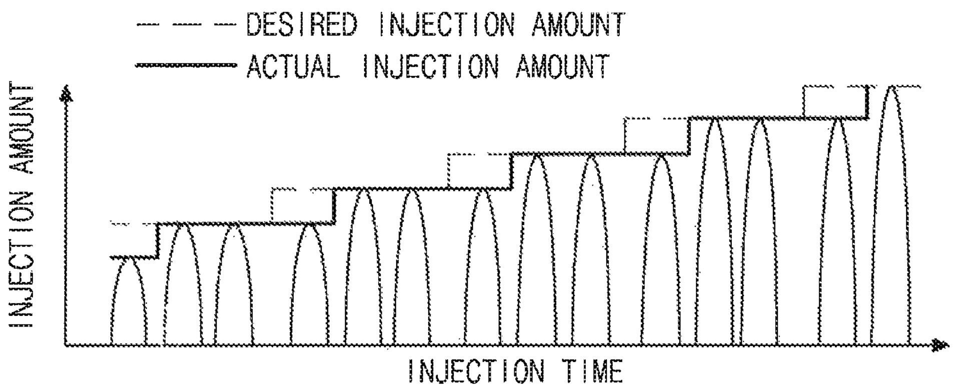
FIG. 4 is a graph showing the relationship between the fuel injection amount and the injection time of an injector according to an embodiment of the present invention.

FIG. 4 is a graph showing the relationship between the fuel injection amount and the injection time of an injector according to an embodiment of the present invention. Referring to FIG. 4, according to the present invention, since the deviation to the fuel injection time is adjusted by the driving semiconductor 200, there is little difference between the desired injection amount and the actual injection amount. In particular, during multi injection in which a small amount of fuel is injected several times by dividing the fuel injection time, the injection amount is controlled to be less (i.e., small) for the initial injection time.

That is, in an embodiment of the present invention, since the deviation in injection timing is directly corrected by the driving semiconductor 200, not through the MCU 300, the corrected value is very quickly reflected. Accordingly, it is possible to adjust the injection amount at the middle or earlier stage in multi injection in accordance with the deviation value of the driving time of the injector 300.

Figure 1:
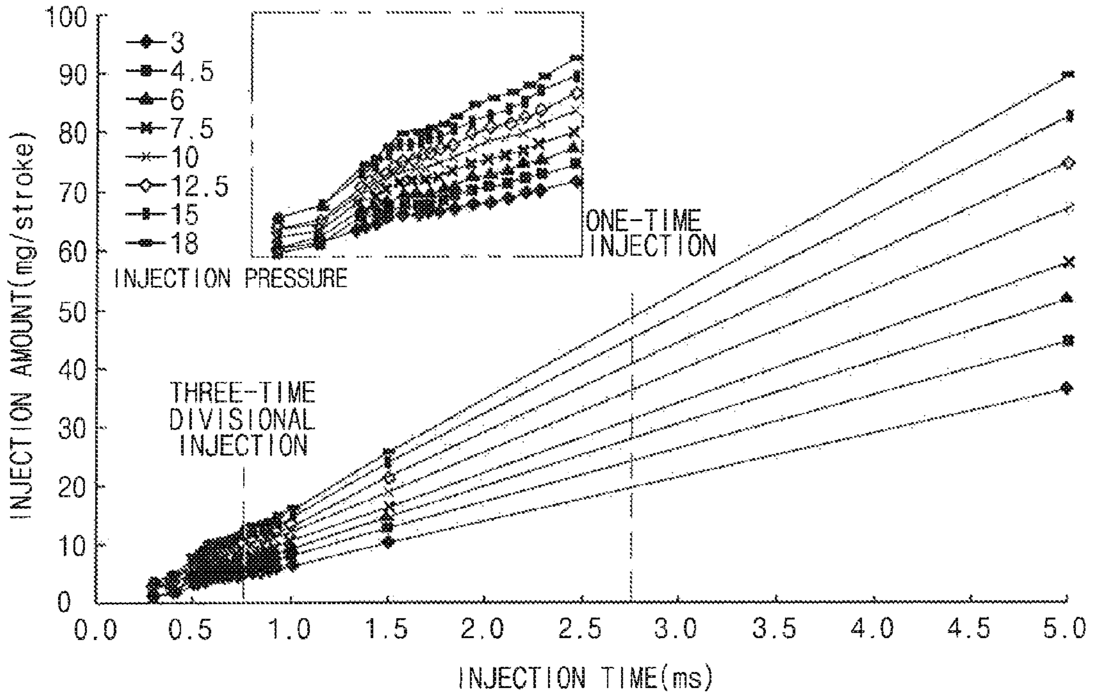
FIG. 1 is a graph showing the relationship between the fuel injection amount and injection time of a common injector.

As in FIG. 1 showing the related art, as the fuel injection time during operation of the injector 300 is reduced, the relationship between the fuel injection amount and the fuel injection time may show nonlinearity. However, in an embodiment of the present invention, the injection characteristic is controlled to be linear by reducing the injection amount for the earlier injection times. When the linearity of the relationship between the fuel injection amount and the fuel injection time is established, it is possible to accurately estimate or control the amount of fuel.

Figure 5:
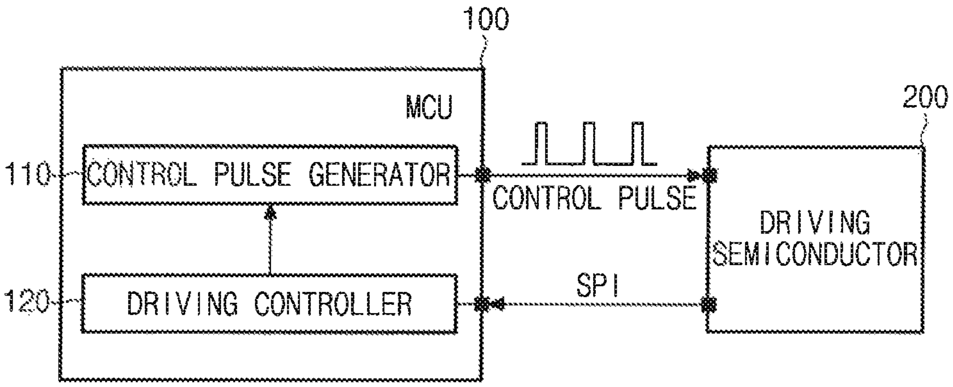
FIG. 5 is a diagram illustrating the detailed description of a micro control unit of FIG. 2.

FIG. 5 is a diagram illustrating the detailed description of the MCU 100 of FIG. 2. The MCU 100 includes a control pulse generator 110 and a driving controller 120. The control pulse generator 110 generates a control pulse for controlling the operation of the injector 300 in accordance with control of the driving controller 120 and transmits the control pulse to the driving semiconductor 200. The driving controller 120 receives correction data from the interface unit 260 of the driving semiconductor 200 and is configured to determine whether there is signal correction by the driving semiconductor 200 and the signal correction information. For example, the driving controller 120 can transmit/receive data through SPI communication with the driving semiconductor 200.

Further, the driving controller 120 controls the operation of the control pulse generator 110 by processing the signal in the signal correction information from the driving semiconductor 200. When the amount of signal correction by the driving semiconductor 200 is over a target value, the driving controller 120 determines that there is an error in the driving semiconductor 200. Accordingly, the driving controller 120 prevents generation of the control pulse by initializing the control pulse generator 110.

Figure 6:
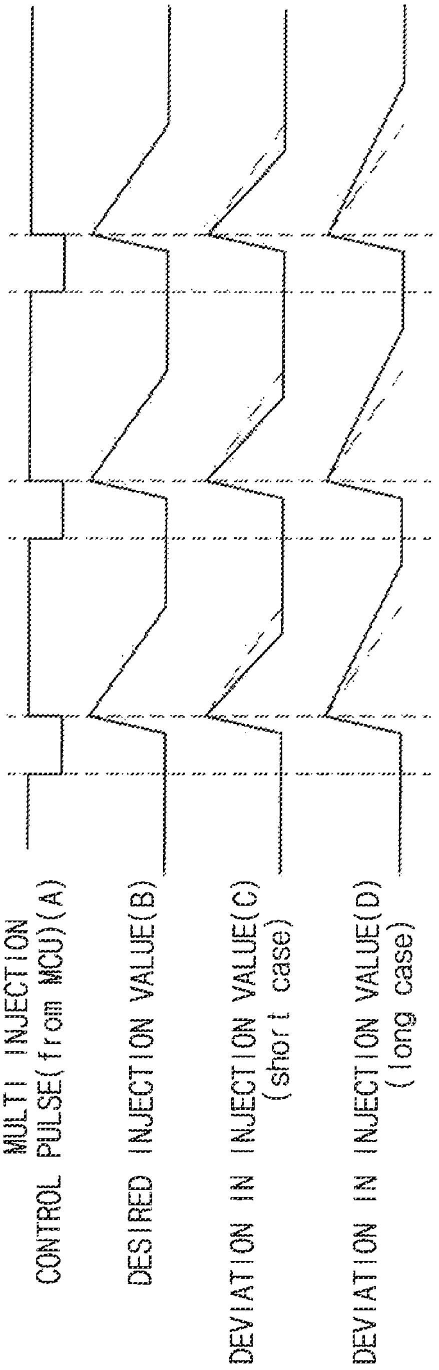
FIG. 6 is a graph showing deviations for each of the injectors in an embodiment of the present invention.

FIG. 6 is a graph showing deviations for each of the injectors in an embodiment of the present invention. (A) of FIG. 6 shows the waveform of an injection control pulse provided to the driving semiconductor 200 from the MCU 100 in multi injection. When the driving semiconductor 200 turns on the injector 300, the control pulse is toggled when it is applied. Further, the driving semiconductor 200 controls the injection timing of the injector 300 in synchronization with the enabling time of the control pulse (A). The driving semiconductor 200 sets a desired injection value of the injector 300, as in (B).

(C) in FIG. 6 shows when the deviation in injection values of the injector 300 is shorter than a desired injection value and (D) shows when the deviation in injection values of the injector 300 is longer than the desired injection value.

Figure 7:
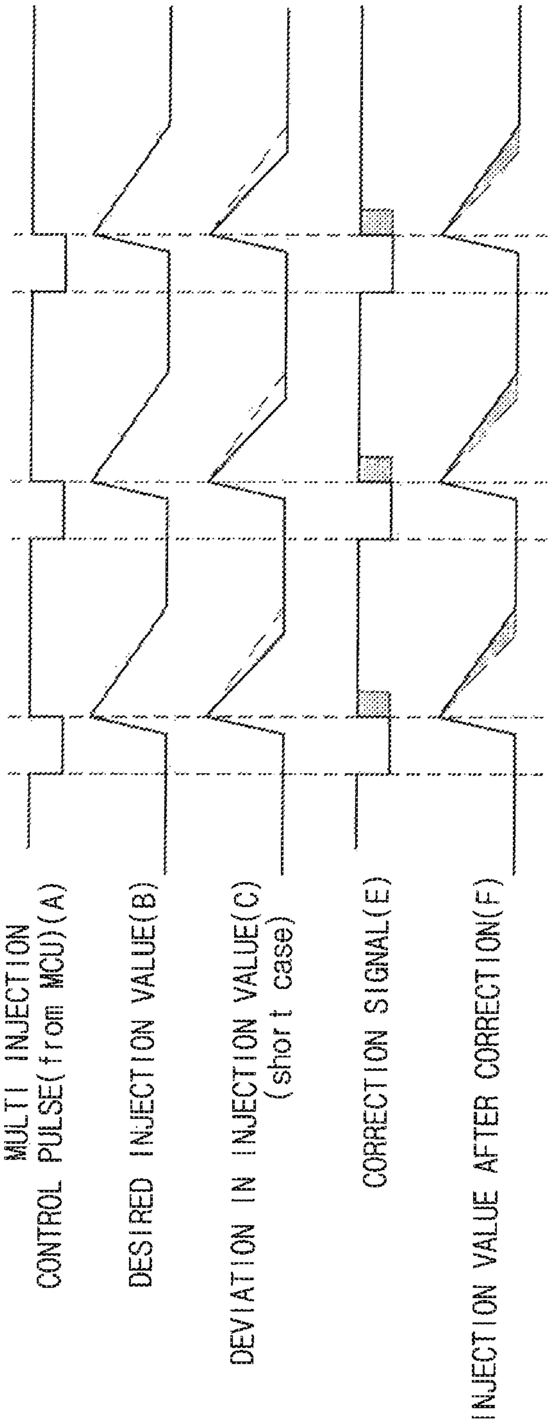
FIG. 7 is a graph showing compensation for a timing overly smaller than a target.

FIG. 7 is a graph showing compensation for a timing overly smaller than a target. When the deviation in injection values of the injector 300 is shorter than a desired injection value, as in FIG. 7, the micro core unit 230 reflects correction data to the control pulse (A). Accordingly, the controller 240 compensates for the deviation so that the driving time of the injector 300 becomes longer than the control pulse (A) by delaying the activation timing (low level) of the injection driving pulse (E). In this case, the waveform (F) can be obtained by compensating for overly small timing (smaller than a target timing) for the actual injection value of the injector to the desired injection value. It can be seen that the injection waveform (F) after correction is almost similar to the desired injection value (B).

Figure 8:
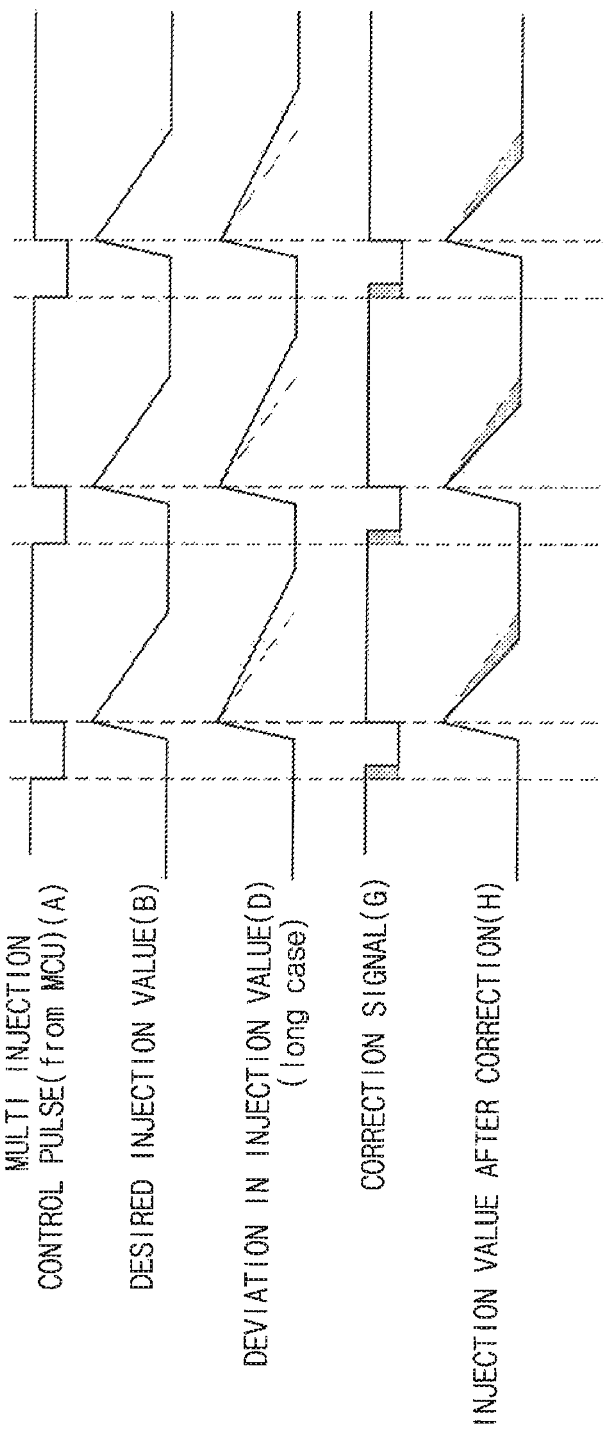
FIG. 8 is a graph showing compensation for a timing overly larger than a target.

FIG. 8 is a graph showing compensation for a timing overly larger than a target. When the deviation in actual injection values of the injector 300 is longer than a desired injection value, as in FIG. 8, the micro core unit 230 reflects correction data (G) to the control pulse (A). Accordingly, the controller 240 compensates for the deviation such that the driving time of the injector 300 becomes shorter than the control pulse (A) by controlling the activation timing (low level) of the injection driving pulse to be shorter (G). In this case, the waveform (H) can be obtained by compensating for overly large timing (larger than the target timing) for the actual injection value of the injector to the desired injection value. It can be seen that the injection waveform (H) after correction is almost similar to the desired injection value (B).

The present invention provides the following effects.

First, a driving semiconductor can implement an algorithm according that is able to directly identify changes in characteristics of an external injector and freely change the implemented algorithm accordingly. Second, it is possible to improve a response speed to correct a deviation after identifying the characteristic by performing a deviation correction function on a driving semiconductor, when the injector is operated for injecting fuel. Third, since the driving semiconductor performs the calculation for estimating an injector characteristic, it is possible to reduce calculation load of an MCU (Micro Control Unit). Fourth, it is possible to reduce power consumption by the driving semiconductor, by preventing unnecessary power consumption with a decrease in number of times signals are transmitted to a main micro control unit.

The exemplary embodiments of the present invention described above have been provided for illustrative purposes. Therefore, those skilled in the art will appreciate that various modifications, alterations, substitutions, and additions are possible without departing from the scope and spirit of the invention as defined in the appended claims; and that such modifications, alterations, substitutions, and additions fall within the scope of the present invention.

What is claimed is:

1. A device for correcting an injector characteristic, comprising:

a micro control unit configured to generate a control pulse that controls an operation of an injector; and a driving semiconductor configured to detect and calculate a driving characteristic related to the injector, and compensate for injection timing of the control pulse based on a deviation in injection timing of the injector, wherein the driving semiconductor includes:

an injector characteristic detector configured to detect the driving characteristic of the injector;

a data processor configured to convert output from the injector characteristic detector into a data value;

a micro core unit configured to generate deviation correction data for the injection timing of the injector based on the data from the data processor;

a controller configured to generate a correction clock by applying the deviation correction data to the control pulse; and an output driving unit configured to control the injector in accordance with the correction clock.

2. The device according to claim 1, wherein the injector characteristic detector includes:

a voltage sensor configured to sense the driving voltage of the injector;

a current sensor configured to sense the driving current of the injector; and a selector configured to select between the outputs from the voltage sensor and the current sensor.

3. The device according to claim 1, wherein the data processor includes:

a data converter configured to convert a signal from the injector characteristic detector into digital data;

a digital filter configured to filter the digital data from the digital converter; and a memory storing output data from the digital filter.

4. The device according to claim 1, wherein the micro core unit initializes the driving semiconductor when the deviation correction data deviates from a target value.

5. The device according to claim 1, wherein the driving semiconductor further includes an interface unit that interfaces the micro controller.

6. The device according to claim 5, wherein the interface unit performs serial parallel interface communication (SPI).

7. The device according to claim 1, wherein the micro core unit is configured to correct a deviation to increase driving timing of the injector when the injection value of the injector is smaller than a target timing, and correct a deviation to decrease the driving timing of the injector when the injection value of the injector is larger than the target timing.

8. The device according to claim 1, wherein the micro controller includes:

a driving controller configured to receive signal correction information from the driving semiconductor and processing the signal in the information; and a control pulse generator controlled by the driving controller to generate the control pulse.

* * * * *